United States Patent
Kitamura

(10) Patent No.: US 10,809,356 B2
(45) Date of Patent: Oct. 20, 2020

(54) MOUNTING ANGLE LEARNING DEVICE

(71) Applicant: DENSO CORPORATION, Kariya, Aichi-pref. (JP)

(72) Inventor: Takayuki Kitamura, Kariya (JP)

(73) Assignee: DENSO CORPORATION, Kariya, Aichi-Pref. (JP)

(*) Notice: Subject to any disclaimer, the term of this patent is extended or adjusted under 35 U.S.C. 154(b) by 184 days.

(21) Appl. No.: 16/086,885

(22) PCT Filed: Mar. 23, 2017

(86) PCT No.: PCT/JP2017/011849
§ 371 (c)(1),
(2) Date: Sep. 20, 2018

(87) PCT Pub. No.: WO2017/164337
PCT Pub. Date: Sep. 28, 2017

(65) Prior Publication Data
US 2019/0107602 A1    Apr. 11, 2019

(30) Foreign Application Priority Data
Mar. 23, 2016  (JP) .................................. 2016-058965

(51) Int. Cl.
*G01S 7/40* (2006.01)
*G01S 13/58* (2006.01)
*G01S 13/42* (2006.01)
*G06N 20/00* (2019.01)
*G01S 13/931* (2020.01)
(Continued)

(52) U.S. Cl.
CPC .............. *G01S 7/4026* (2013.01); *G01S 7/40* (2013.01); *G01S 13/42* (2013.01); *G01S 13/584* (2013.01); *G01S 13/931* (2013.01); *G06N 20/00* (2019.01); *G01S 13/34* (2013.01); *G01S 2007/356* (2013.01); *G01S 2007/403* (2013.01); *G01S 2013/93272* (2020.01); *G01S 2013/93274* (2020.01); *G01S 2013/93275* (2020.01)

(58) Field of Classification Search
CPC ........ G01S 7/40; G01S 13/931; G01S 7/4026; G01S 13/93; G01S 2013/93274; G01S 13/26; G01S 2013/93271; G01S 2007/356; G01S 2013/93272; G01S 2013/93275; G06N 20/00
See application file for complete search history.

(56) References Cited

U.S. PATENT DOCUMENTS 9,618,616 B2 * 4/2017 Kishigami ............ G01S 7/2923
10,054,671 B2 * 8/2018 Satou ..................... G01S 13/931
(Continued)

FOREIGN PATENT DOCUMENTS

JP    2007-003395 A    1/2007
JP    2010-249613 A    11/2010

*Primary Examiner* — Olumide Ajibade Akonai
(74) *Attorney, Agent, or Firm* — Maschoff Brennan

(57) ABSTRACT

A learning selection unit selects execution of learning by a rapid learning unit at a learning moment if the number of times of learning is less than a number threshold value, and selects execution of learning by an accurate learning unit at the learning moment if the number of times of learning is greater than the number threshold value. The number of times of learning indicates how many times a learned value has been updated by the time learning at the learning moment is started.

5 Claims, 9 Drawing Sheets

(51) Int. Cl.
    *G01S 13/34*     (2006.01)
    *G01S 7/35*     (2006.01)

(56) References Cited

U.S. PATENT DOCUMENTS

| | | | |
|---|---|---|---|
| 10,288,720 B1* | 5/2019 | Adolf | G01S 13/87 |
| 2005/0024261 A1* | 2/2005 | Fujita | G01S 7/4026 |
| | | | 342/174 |
| 2006/0103927 A1 | 5/2006 | Samukawa et al. | |
| 2013/0218398 A1* | 8/2013 | Gandhi | G01S 13/58 |
| | | | 701/31.1 |
| 2016/0011299 A1 | 1/2016 | Satou et al. | |
| 2016/0377701 A1* | 12/2016 | Kim | G01S 15/931 |
| | | | 342/70 |
| 2017/0050627 A1* | 2/2017 | Lee | B60T 8/17558 |

\* cited by examiner

FIG.7
UPPER-LEVEL MOVING AVERAGING
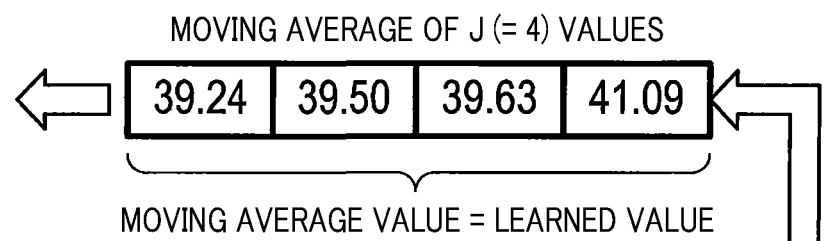
MOVING AVERAGE VALUE = LEARNED VALUE
LOWER-LEVEL AVERAGING
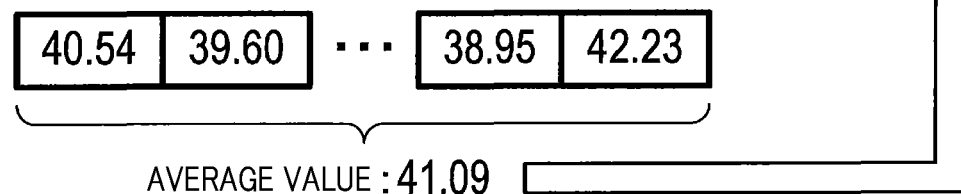
AVERAGE VALUE : 41.09

FIG.9

| | | | | |
|---|---|---|---|---|
| A | 50.00 | 50.00 | 50.00 | 50.00 |
| B | 50.00 | 50.00 | 50.00 | 39.24 |

⋮

| | | | | |
|---|---|---|---|---|
| C | 39.24 | 39.50 | 39.63 | 41.09 |
| D | 39.50 | 39.63 | 41.09 | 41.33 |

⋮

| | | | | |
|---|---|---|---|---|
| E | 39.54 | 39.77 | 39.68 | 40.30 |
| F | 50.00 | 50.00 | 50.00 | 50.00 |
| G | 50.00 | 50.00 | 50.00 | 55.18 |

⋮

| | | | | |
|---|---|---|---|---|
| H | 55.18 | 54.14 | 55.93 | 56.20 |

MOUNTING ANGLE LEARNING DEVICE

CROSS-REFERENCE TO RELATED APPLICATION

The present international application is based on and claims priority to Japanese Patent Application No. 2016-058965 filed on Mar. 23, 2016, the entire contents of which are incorporated herein by reference.

TECHNICAL FIELD

The present disclosure relates to a device that learns the mounting angle of a vehicle-mounted radar.

BACKGROUND ART

If the actual mounting angle of a vehicle-mounted radar is different from a correct mounting angle due to some reason (e.g., a loose bolt), the bearing to an object could be incorrectly detected. Techniques of estimating the mounting angle of a vehicle-mounted radar device using observation data of the vehicle-mounted radar device have been proposed to deal with this problem, such as the vehicle-mounted radar device described in PTL 1 below. However, since errors are included in observation data, a value equivalent to the mounting angle (hereinafter referred to as an instantaneous value) estimated from the observation data including errors also includes an error. Therefore, the vehicle-mounted radar device calculates the trimmed mean of a set of instantaneous values, and calculates the mounting angle from the calculated mean.

CITATION LIST

Patent Literature

[PTL 1] JP 2014-153256 A

SUMMARY OF THE INVENTION

Another possible method of computing the mounting angle includes, for example, learning the smoothed moving average of instantaneous values of the mounting angle and regarding the learned value as the mounting angle. However, the inventors have found through their detailed study that this type of learning device has the following problem: an increase in the speed of learning causes a decrease in the accuracy of learning and fluctuations in the convergent learned value, and an increase in the accuracy of learning causes an increase in the time required for convergence.

An aspect of the present disclosure provides a mounting angle learning device capable of achieving both a reduction in the time required for convergence and an improvement in the accuracy of learning.

An aspect of the present disclosure is a mounting angle learning device that learns a mounting angle representing the orientation of a vehicle-mounted radar in a vehicle. The vehicle-mounted radar detects the bearing to an object using electromagnetic waves. The mounting angle learning device includes an estimation value calculation unit and a learning unit. The estimation value calculation unit repeatedly calculates estimation values of the mounting angle using transmission and reception waves of the vehicle-mounted radar. The learning unit includes a rapid learning unit, an accurate learning unit, and a learning selection unit, and updates a learned value of the mounting angle at a learning moment to a value calculated by smoothing a plurality of estimation values calculated by the learning moment. The rapid learning unit sets, to a first degree, the degree of contribution of the estimation value at the learning moment to the learned value updated. The accurate learning unit sets the degree of contribution of the estimation value to a second degree lower than the first degree. The learning selection unit selects execution of learning by the rapid learning unit if the number of times of learning is less than a number threshold value, and selects execution of learning by the accurate learning unit if the number of times of learning is greater than the number threshold value. The number of times of learning indicates how many times the learned value has been updated by the time learning at the learning moment is started.

According to the present disclosure, in the initial stage of learning where the error between the learned value and the true value is large, rapid learning is performed. Therefore, estimation values are more likely to be reflected in the learned value, so that the learned value can be rapidly brought close to the true value. In contrast, after the learned value is brought close to the true value with the progress of learning, accurate learning is executed. Therefore, estimation values are less likely to be reflected in the learned value, so that fluctuations in the learned value due to variations in estimation values can be prevented, and the learned value can be stably calculated. Thus, both a reduction in the time required for convergence and an improvement in the accuracy of learning can be achieved.

Note that reference signs in parentheses described in the claims indicate correspondence relations with specific means described in the following embodiments according to an aspect, and do not limit the technical scope of the present disclosure.

BRIEF DESCRIPTION OF DRAWINGS

FIG. 7 is an explanatory diagram illustrating the process of averaging estimation values at the lower level and further calculating a moving average at the upper level.

FIG. 9 is a diagram illustrating average values for use in moving averaging at moments A to H in the time chart illustrated in FIG. 8.

DESCRIPTION OF EMBODIMENTS

Hereinafter, modes for carrying out a technique of the present discloser will be described with reference to the drawings.

<Configuration>

Figure 1:
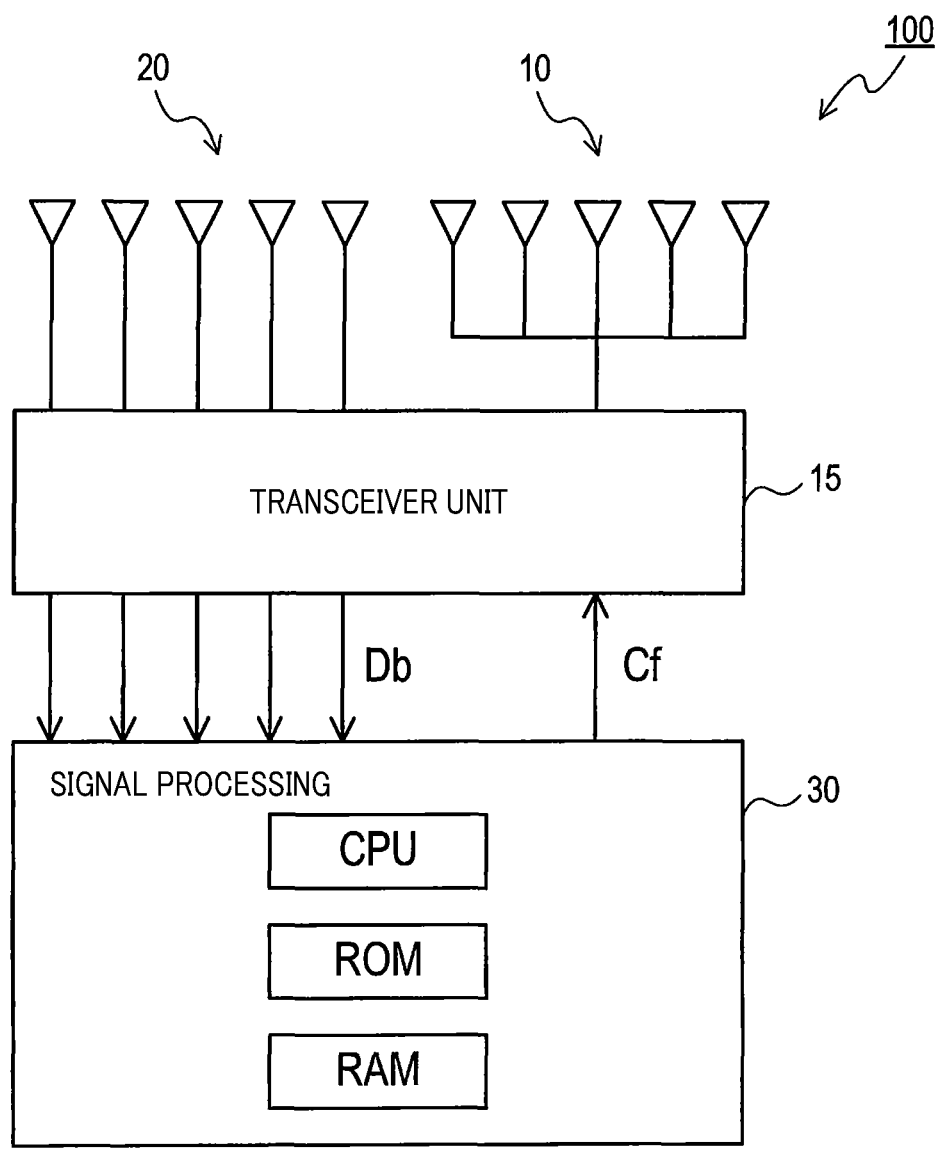
FIG. 1 is a block diagram illustrating a configuration of a vehicle-mounted radar device.

First, a configuration of a radar device including a mounting angle learning device according to the present embodiment will be described with reference to FIG. 1. The radar device according to the present embodiment includes a millimeter-wave radar 100 and a processing device 30. In the present embodiment, the processing device 30 corresponds to a mounting angle learning device, and the millimeter-wave radar 100 corresponds to a vehicle-mounted radar.

Figure 3:
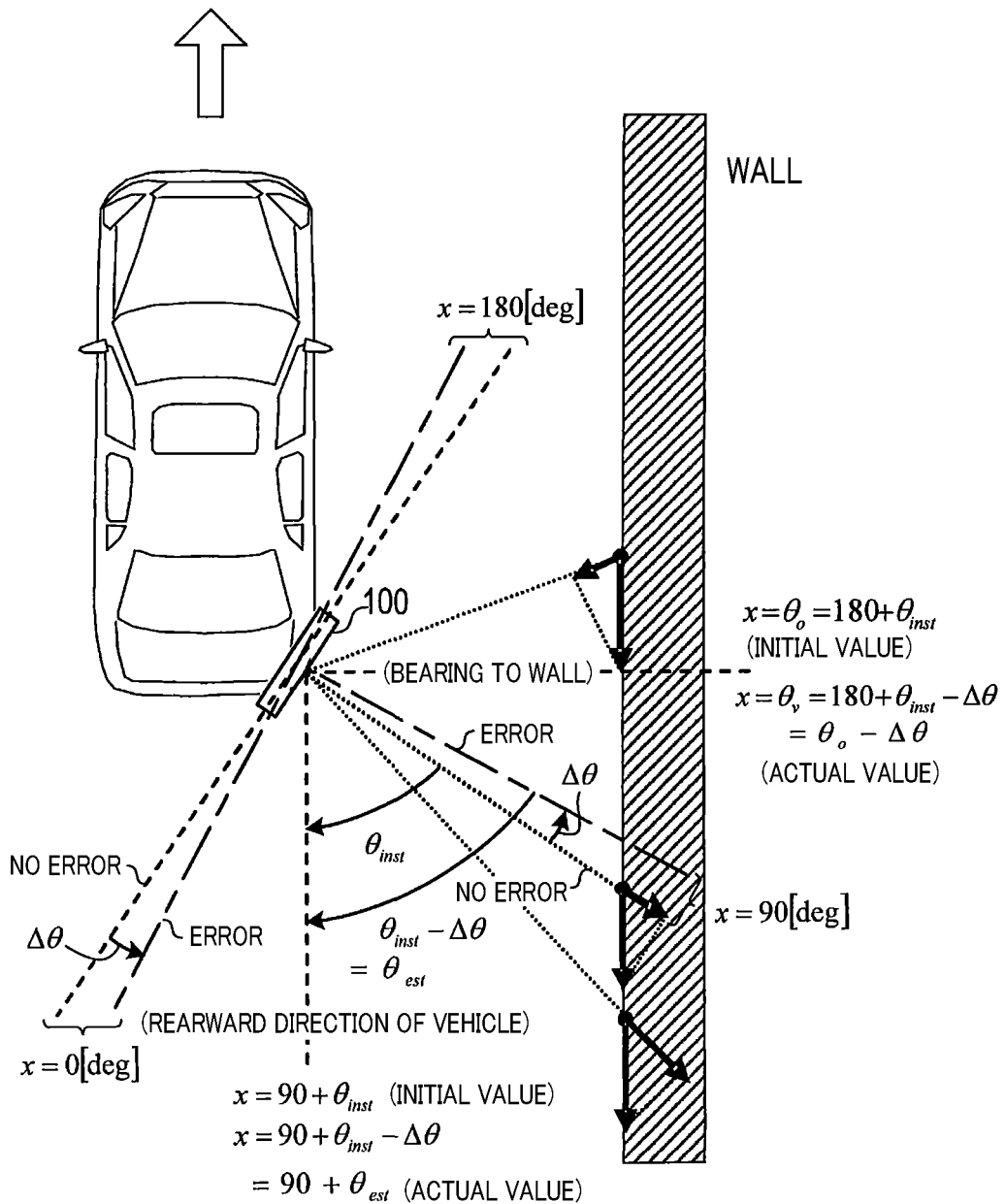
FIG. 3 is an explanatory diagram illustrating the installation state of the vehicle-mounted radar device and how the relative velocity of and bearing to a lateral stationary object are detected by the vehicle-mounted radar device.

The millimeter-wave radar 100 includes a transceiver unit 15, a transmission antenna unit 10, and a reception antenna unit 20, and is installed in a bumper of a vehicle. The bumper includes a material that has at least partial transparency to electromagnetic waves. In this example, as illustrated in FIG. 3, the millimeter-wave radar 100 is installed near the right end of the rear bumper of the vehicle as viewed in the traveling direction of the vehicle, and is oriented such that the area lateral to the vehicle is included in the search range. The term "lateral" to the vehicle refers to the direction of 90° with respect to the longitudinal direction (front-rear direction) of the vehicle. In the present embodiment, the millimeter-wave radar 100 operates as a multi-frequency CW radar. Note that CW is an abbreviation for continuous wave.

The transceiver unit 15 generates a transmission signal in accordance with a frequency control signal Cf from the processing device 30, and supplies the generated transmission signal to the transmission antenna unit 10. The frequency control signal Cf is a signal generated for transmitting CW radar waves of a predetermined frequency for a predetermined period of time. The transmission antenna unit 10 includes K antennas aligned in the horizontal direction, and emits radar waves in accordance with the transmission signal. Note that "K" is an integer of two or more.

The reception antenna unit 20 includes L antennas aligned in the horizontal direction, and receives, at each antenna, radar waves reflected by an object to supply a reception signal to the transceiver unit 15. Note that "L" is an integer of two or more. The transceiver unit 15 generates a beat signal having a frequency component of the difference between a reception signal and a transmission signal. The transceiver unit 15 then samples the generated beat signal to convert the beat signal into sampling data Db, and supplies the sampling data Db to the processing device 30 for each transmission frequency and for each antenna.

The processing device 30 mainly includes a well-known microcomputer having a CPU, ROM, RAM, I/O interface, and the like. The processing device 30 also includes a computation processing device that executes signal processing such as FFT processing on the sampling data Db fetched from the transceiver unit 15. The CPU executes a program stored in a non-transitory tangible computer readable storage medium, whereby each function of the processing device 30 is implemented. In this example, the ROM corresponds to the non-transitory tangible computer readable storage medium with the program stored therein. Once the program is executed, the method corresponding to the program is executed. The RAM partially includes a non-volatile memory that keeps its contents even while the processing device 30 is off, and the non-volatile memory stores the estimation value θest of the mounting angle of the millimeter-wave radar 100 estimated in each measurement cycle and also stores the learned value θsm. Note that one measurement cycle means that radar waves of a plurality of different set frequencies are entirely transmitted and received. FFT is an abbreviation for fast Fourier transform.

As the CPU executes the program, the processing device 30 executes a process of estimating the mounting angle and a process of learning the estimated mounting angle. The way these processes are executed by the processing device 30 is not limited to software, and some or all of the processes may be executed using hardware including a combination of logic and analog circuits and the like.

<Mounting Angle Estimation>

[1. Estimation Process]

Figure 2:
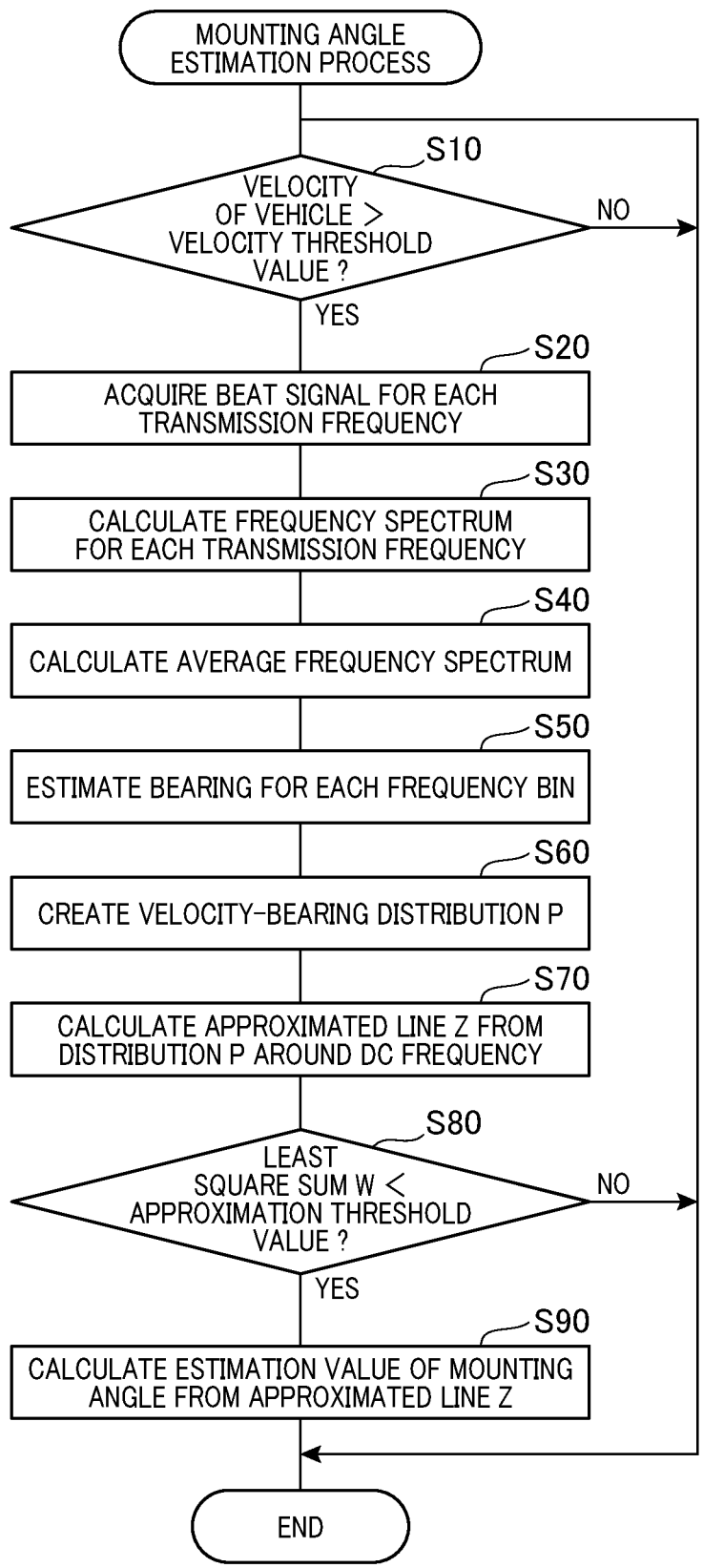
FIG. 2 is a flowchart illustrating a processing procedure for estimating the mounting angle.

Next, the process of estimating the mounting angle that is executed by the processing device 30 will be described with reference to the flowchart of FIG. 2. This process is activated in each measurement cycle to estimate the mounting angle of the millimeter-wave radar 100. The principles of estimation will be described in detail later, but in short, the mounting angle is detected in this process by utilizing the correspondence relation between the relative velocity of a stationary object lateral to the vehicle and the bearing to the stationary object. The mounting angle as used herein is the angle between the optical axis of the millimeter-wave radar 100 and the rearward direction of the vehicle. The optical axis of the millimeter-wave radar 100 is an axis passing through the center of the detection range of the millimeter-wave radar 100.

First, in S10 ("S" represents "step"), the velocity of the vehicle is acquired over a vehicle network, and it is determined whether the acquired velocity of the vehicle is greater than a preset velocity threshold value. The velocity threshold value is set at a velocity that is expected to ensure accurate estimation of the mounting angle, as will be described in detail later. If a "YES" decision is made in S10, the process proceeds to S20. If a "NO" decision is made in S10, the process is finished.

Next, in S20, the sampling data Db of beat signals of all the transmission frequencies of multi-frequency CW are acquired for each of the antennas constituting the reception antenna unit 20.

Next, in S30, frequency analysis is performed on the sampling data Db, whereby a frequency spectrum is calculated for each of the transmission frequencies of multi-frequency CW and for each of the antennas constituting the reception antenna unit 20. Here, FFT is used for frequency analysis. A frequency bin of the frequency spectrum obtained in this manner represents the relative velocity between the object that has reflected radar waves and the vehicle.

Next, in S40, with regard to the frequency spectrum calculated in S30 for each transmission frequency and for each antenna, an average frequency spectrum is calculated for each antenna by averaging the frequency spectra of the respective transmission frequencies.

Next, in S50, a frequency bin from which the peak value of spectrum power equal to or greater than a preset threshold value is detected is extracted from the average frequency spectrum, and the incoming direction of reflected waves, that is, the bearing to the object that has reflected radar waves, is estimated for each frequency bin. A bearing estimate is desirably calculated using a high-resolution estimation algorithm such as MUSIC and Capon, but an algorithm with a small computational load may be used, such as DBF. Note that MUSIC is an abbreviation for multiple signal classification, and DBF is an abbreviation for digital beam forming.

Next, in S60, the average frequency spectrum calculated in S40 and the bearing estimate made in S50 are used for creating the two-dimensional distribution P of observation data including the relative velocity and bearing estimate between the vehicle and the object.

Next, in S70, on the basis of observation data in which the absolute value of the relative velocity is equal to or less than a preset upper limit value, an approximated line Z is calculated using Formula (1). The approximated line Z represents the relation between the relative velocity y and the azimuth x detected for the stationary object. In the formula, "θinst" is the factory preset initial mounting angle of the millimeter-wave radar 100, "A" is a constant, and "N_bin" is the number of FFT points, e.g., 256. Note that "N_bin/2" corresponds to a velocity of zero relative to the object.

[Formula 1]

$$x = \frac{A(y - N\_bin/2)}{V_{self}} + 180 - \theta_{inst} \quad (1)$$

Next, in S80, the least square sum W of the distribution P of observation data used for calculating the approximated line Z is calculated. The least square sum W represents the degree of variation in observation data: the greater the degree of variation is, the greater the least square sum W is. It is determined in S80 whether the calculated least square sum W is less than a preset approximation threshold value. If the least square sum W is less than the approximation threshold value, it is determined that the object that has reflected radar waves is a stationary object. In this case, a "YES" decision is made in S80, and the process proceeds to S90. In contrast, if the least square sum W is equal to or greater than the approximation threshold value, it is determined that the object that has reflected radar waves is a moving object. In this case, a "NO" decision is made in S80, and the process is finished.

Next, in S90, the detection azimuth θv that is the azimuth corresponding to a relative velocity of zero on the approximated line Z is calculated as illustrated in FIG. 3. The error Δθ is then calculated by subtracting the detection azimuth θv from the theoretical azimuth θo. Note that the theoretical azimuth θo represents the azimuth at which observation data of a relative velocity of zero are detected with the millimeter-wave radar 100 attached at the mounting angle θinst, that is, the direction of 90° with respect to the longitudinal direction of the vehicle. The error Δθ is the difference between the mounting angle θinst and the actual mounting angle. Furthermore, the estimation value θest of the mounting angle is calculated using the equation θest=θinst−Δθ. The process is thus finished. In the present embodiment, steps S10 to S90 correspond to the process that is executed by the function of an estimation value calculation unit.

[2. Estimation Principles]

Figure 4:
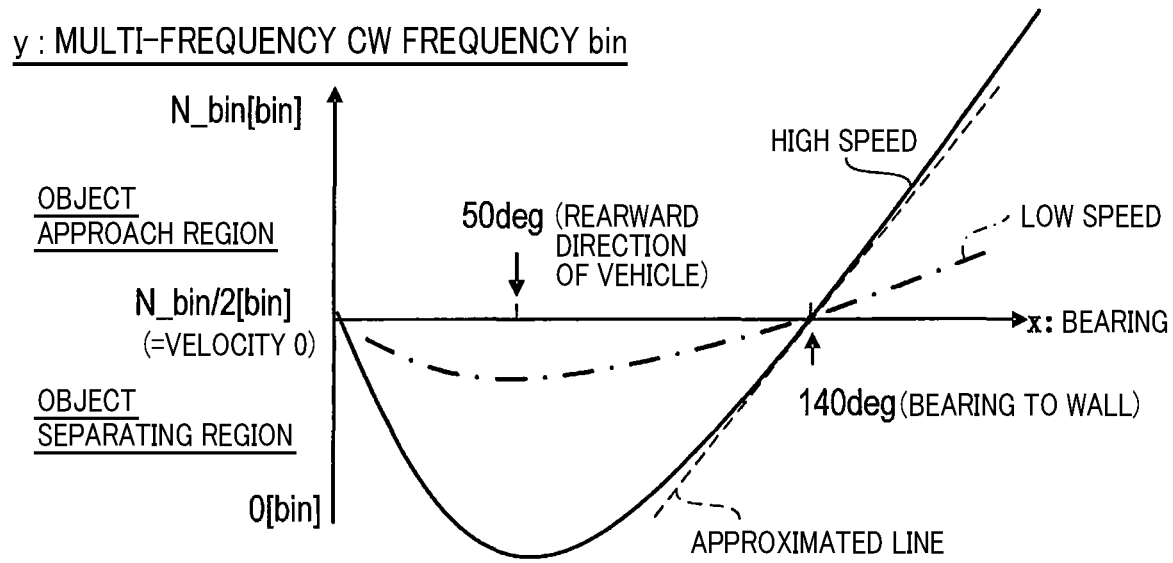
FIG. 4 is an explanatory diagram illustrating the relation between theoretical curves and an approximated line and the dependence of the theoretical curves on the velocity of the vehicle.

Next, the principles of mounting angle estimation according to the present embodiment will be described in detail. In a case where a stationary object such as a wall is located lateral to the vehicle, reflected waves are obtained from various positions on the wall. The bearing to a reflection point on the wall and the relative velocity detected for the reflection point relate to each other as illustrated in FIG. 4. Specifically, if a reflection point is located substantially lateral to the installation position of the millimeter-wave radar 100, the relative velocity of the reflection point is zero. The term "substantially lateral" refers to a bearing of 90° to the wall with respect to the traveling direction of the vehicle. As illustrated in FIG. 3, the relative velocity of a reflection point located in the traveling direction of the vehicle ahead of the lateral reflection point has a positive value representing the approach to the vehicle. The relative velocity of a reflection point located in the direction opposite to the traveling direction of the vehicle behind the lateral reflection point has a negative value representing the separation from the vehicle. In either of these cases, the absolute value of the relative velocity increases as the distance from the lateral position increases. The graph illustrated in FIG. 4 has a line-symmetric shape with respect to the rearward direction of the vehicle.

Let the search range of the millimeter-wave radar 100 be 0 to 180 [deg]. Suppose the millimeter-wave radar 100 is attached to the vehicle such that the rearward direction of the vehicle is deviated from the direction of 90 [deg] in the search range. That is, the rearward direction of the vehicle is deviated from the direction of the optical axis of the millimeter-wave radar 100, by θinst [deg] clockwise as viewed from above the vehicle. Note that counterclockwise and clockwise azimuths x are represented by positive and negative values, respectively. In this case, θinst has a negative value, and the azimuth x of the bearing from the vehicle to the wall is expressed by θo=180+θinst [deg]. The graph in FIG. 4 indicates that the initial mounting angle θinst is −40 [deg]. Specifically, the azimuth x of the bearing to the wall is expressed by θo=140 [deg], and the azimuth x of the rearward direction of the vehicle is 50 [deg]. This state is referred to as a factory preset state.

If the millimeter-wave radar 100 is not mounted at the specified mounting angle in the factory, or if the mounting angle of the millimeter-wave radar 100 is changed after shipment from the factory, an error occurs between the mounting angle θinst and the actual mounting angle. Suppose an error of Δθ [deg] occurs counterclockwise as viewed from above the vehicle. In this case, Δθ has a positive value, the azimuth x of the bearing from the vehicle to the wall is expressed by θv=180+θinst−Δθ=θo−Δθ, and the estimation value θest of the mounting angle is expressed by θest=θinst−Δθ. In short, the estimation value θest can be calculated by computing Δθ.

In FIG. 4, the solid line and the dashed-dotted line respectively indicate the theoretical curves for high speed and low speed calculated on the premise of the factory preset state. The broken line indicates the approximated line Z for the solid theoretical curve calculated using Formula (1).

As indicated by the theoretical curves in the figure, the lower the velocity Vself of the vehicle, the smaller the change in the frequency bin that is the relative velocity with respect to the direction, and the higher the velocity Vself of the vehicle, the larger the change in the frequency bin that is the relative velocity with respect to the direction. Note that the frequency bin representing the relative velocity is in the range of 0 to N_bin [bin], and N_bin/2 [bin] in the middle of 0 to N_bin [bin] indicates a relative velocity of zero. In this case, the range of N_bin/2 to N_bin [bin] is an object approaching region where the stationary object is observed as if it were approaching the vehicle, whereas the range of 0 to N_bin/2 [bin] is an object separating region where the stationary object is observed as if it were moving away from the vehicle.

Figure 5:
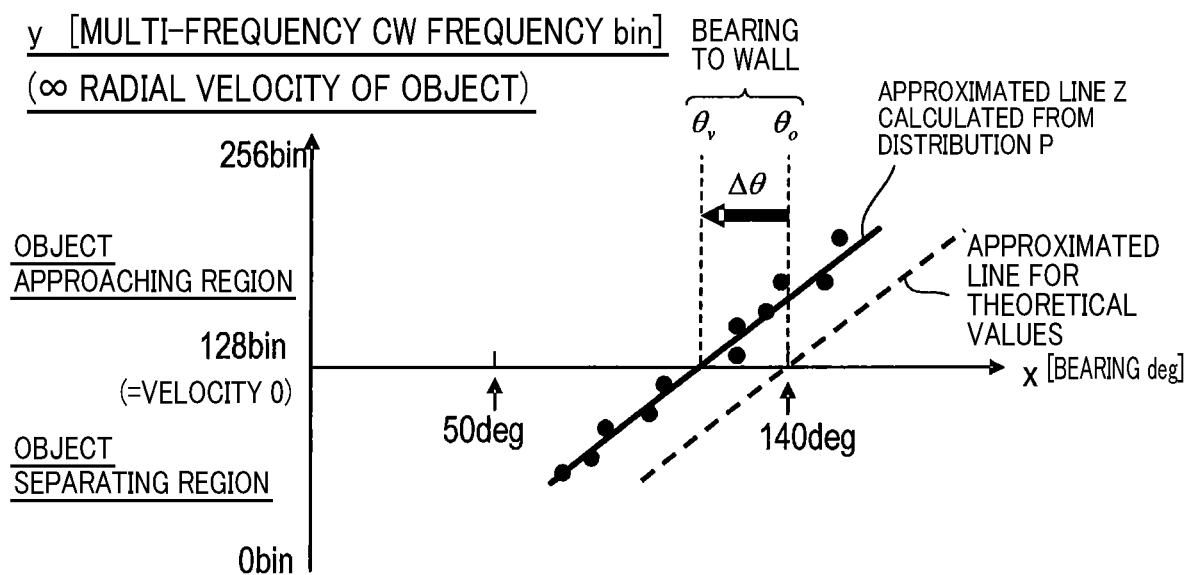
FIG. 5 is an explanatory diagram illustrating a method of estimating the mounting angle using an approximated line.

In FIG. 5, the broken line indicates the theoretical approximated line for the theoretical curve for high speed, and the solid line indicates the approximated line Z calculated from the distribution P of actual data. The error Δθ is calculated from the difference between the theoretical approximated line and the approximated line Z in the x-axis direction, i.e., the bearing axis direction. Furthermore, the estimation value θest in the current measurement cycle can be calculated from the approximated line Z.

However, as illustrated in FIG. 4, under the low speed condition, the slope of the curve representing the distribution P is small, and the degree of approximation of the distribution P to a line is low. Therefore, the estimation value θest is not calculated under the low speed condition since the accuracy of estimating the estimation value θest from the approximated line Z is low under the low speed condition. The above-mentioned velocity threshold value is set at a velocity that ensures a sufficiently high degree of approximation of the distribution P to a line.

<Mounting Angle Learning>

[1. Learning Process]

Figure 6:
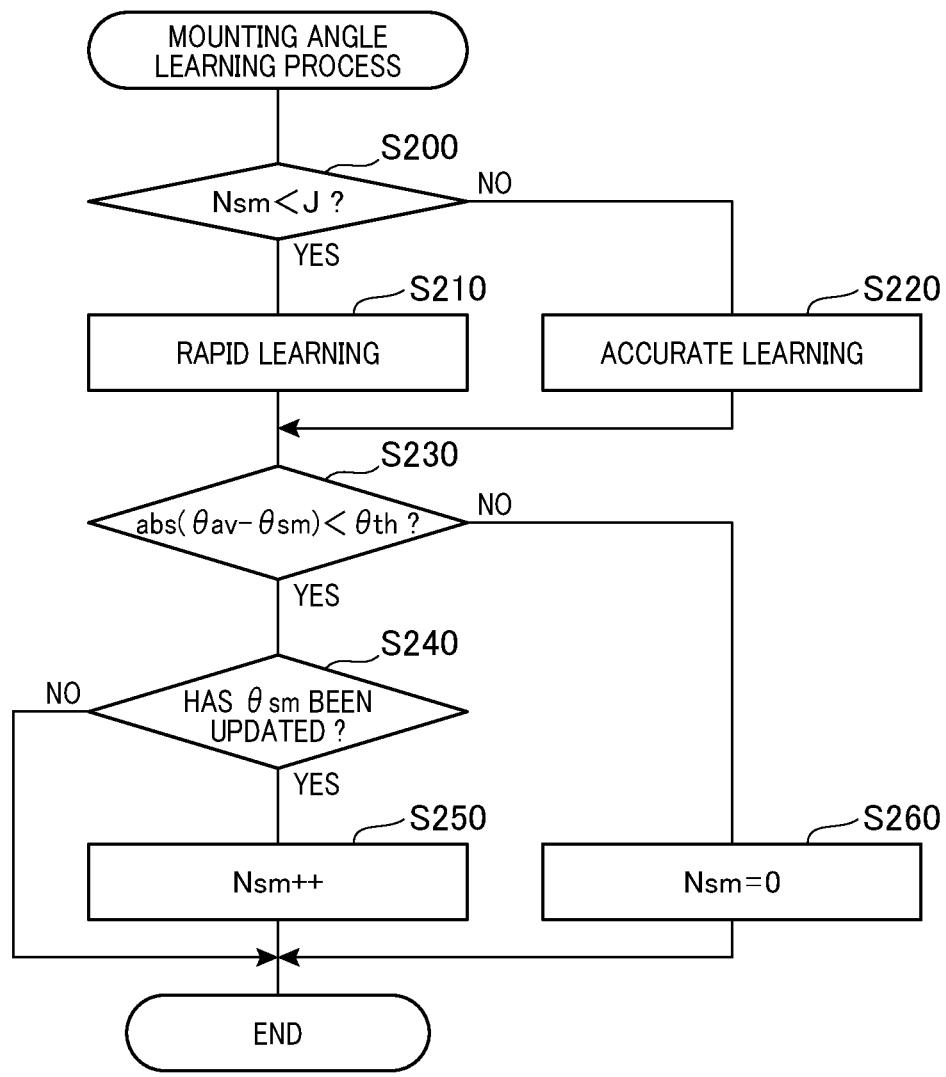
FIG. 6 is a flowchart illustrating a processing procedure for learning the mounting angle.

Next, the process of learning the mounting angle will be described in detail with reference to the flowchart of FIG. 6. This process is activated each time the estimation value θest of the mounting angle is calculated to update the learned value θsm to the smoothed value of a plurality of estimation values θest calculated by the learning moment.

First, in S200, it is determined whether the number of times of learning Nsm is less than J. Note that "J" is any integer of two or more. Every time the learned value θsm is updated, learning is completed one time. In the initial stage of learning, it is desirable that rapid learning be executed at high learning speed in order to rapidly bring the learned value θsm close to the true value of the mounting angle. In contrast, in the advanced stage of learning, it is desirable that accurate learning be executed in order to keep the learned value stable. Therefore, if the number of times of learning Nsm is less than J, a "YES" decision is made in S200, and the process proceeds to S210 for rapid learning.

In contrast, if the number of times of learning Nsm is equal to or greater than J, a "NO" decision is made in S200, and the process proceeds to S220 for accurate learning. Specifically, after learning is completed J times, the learning mode is switched from rapid learning to accurate learning at the time that the (J+1)-th time of learning is started. The number of times of learning Nsm that can ensure a sufficient convergence of the learned value θsm is calculated through simulation, and the calculated number of times of learning Nsm is set for the value of J. In the present embodiment, step S200 corresponds to the process that is executed by the function of a learning selection unit.

In S210, rapid learning is performed, and the learned value θsm is updated every I measurement cycles. In contrast, in S220, accurate learning is performed, and the learned value θsm is updated every I measurement cycles. Note that "I" is an integer of one or more, and the value of "I" for rapid learning is smaller than that for accurate learning. The value of "I" for rapid learning is set at a value that can ensure that errors included in estimation values θest are smoothed to some extent, for example. The value of "I" for accurate learning is set in accordance with how frequently the learned value θsm is needed, for example.

More specifically, as illustrated in FIG. 7, two-stage averaging is performed in rapid learning and accurate learning. Lower-level averaging, or first-stage averaging, is the process of averaging I estimation values θest estimated in the last I measurement cycles including the current learning moment. In FIG. 7, the value in each of the rectangles indicating lower-level averaging is the estimation value θest calculated in each measurement cycle. Calculated lower-level average values are stored in a shift register. The shift register is a memory that accumulates only J pieces of data by ejecting one piece of data every time another piece of data is stored. Upper-level averaging, or second-stage averaging, is the process of averaging J lower-level average values accumulated in the shift register every I measurement cycles. Since values accumulated in the shift register are sequentially updated, an upper-level average is equivalent to the moving average of lower-level average values. The moving average value calculated in this manner is the learned value θsm for the current learning moment.

After the last updating moment for the learned value θsm until the (I−1)-th measurement cycle, the learned value θsm obtained at the last updating moment is kept as it is and set as the learned value θsm for each measurement cycle. Therefore, the number of times of learning Nsm is equivalent to the number of times that upper-level moving averaging is executed, and a learning moment arrives every I measurement cycles. Note that the value of "J" is the same as the determination value "J" used in S200. The moving averages of the same number of average values are calculated in rapid learning and accurate learning.

In this manner, the learned value θsm is updated to the average value of I×J estimation values θest every I measurement cycles. Thus, the degree of contribution of the estimation value θest calculated at the learning moment to the updated learned value θsm is 1/(I×J). Accordingly, the degree W1 that is the degree of contribution in rapid learning is higher than the degree W2 in accurate learning. In rapid learning, therefore, estimation values θest are more likely to be reflected in the learned value θsm, leading to a high speed of learning. In contrast, in accurate learning, estimation values θest are less likely to be reflected in the learned value θsm, preventing fluctuations in the learned value θsm due to error components included in estimation values θest.

Note that in the present embodiment, I measurement cycles correspond to an averaging period. In the present embodiment, step S210 corresponds to the process that is executed by the function of a rapid learning unit, and step S220 corresponds to the process that is executed by the function of an accurate learning unit.

Next, in S230, it is determined whether the absolute value of the difference between the average value θav of estimation values θest in a predetermined period Tc immediately before the current measurement cycle and the learned value θsm calculated in S210 or S220 is less than an angle threshold value θth.

The mounting angle sometimes changes suddenly due to, for example, a slight vehicle collision and a loose mounting bolt of the millimeter-wave radar 100. Even when there is no change in the installation position of the millimeter-wave radar 100, the optical axis of the millimeter-wave radar 100 can bend due to adhesion of snow, ice, dirt, or the like to the bumper of the vehicle, causing a sudden, substantial change in the mounting angle. Therefore, by comparing the average value θav and the learned value θsm calculated in the current measurement cycle, it is determined whether there is a sudden change in the mounting angle during the period from the end of the last measurement cycle to the start of the current measurement cycle.

If the predetermined period Tc is too long, the determination of a sudden change may be delayed since the influence of the estimation value θest obtained before the sudden change on θav lasts for a long period after the sudden change. In contrast, if the predetermined period Tc is too short, a sudden change may be erroneously observed upon occurrence of a disturbance. Therefore, the predetermined period Tc is set such that the influence of a disturbance on θav can be reduced and that the estimation value θest obtained before a sudden change can be prevented from having a lasting influence. For example, the predetermined period Tc is in the range of the averaging period for estimation values θest in rapid learning to the averaging period for estimation values θest in accurate learning. In the present embodiment, the predetermined period Tc corresponds to a determination period, and step S230 corresponds to the process that is executed by the function of a sudden change determination unit.

In the event of a sudden change in the mounting angle, it is desirable that the learned value θsm rapidly converge to the true value after the sudden change. Therefore, if the absolute value of (θav−θsm) is equal to or greater than the angle threshold value θth, the process proceeds to S260 to reset the number of times of learning Nsm to zero, and the process is finished. Consequently, rapid learning is executed in the process of the next measurement cycle. In contrast, if the absolute value is less than the angle threshold value θth, the process proceeds to S240 to determine whether the learned value θsm has been updated in the process of the current measurement cycle. If a "YES" decision is made in S240, the number of times of learning Nsm is incremented by one in S250, and the process is finished. If a "NO" decision is made in S240, the process is finished accordingly. In the present embodiment, step S260 corresponds to the process that is executed by the function of a reset unit.

[2. Learning Operation]

Figure 8:
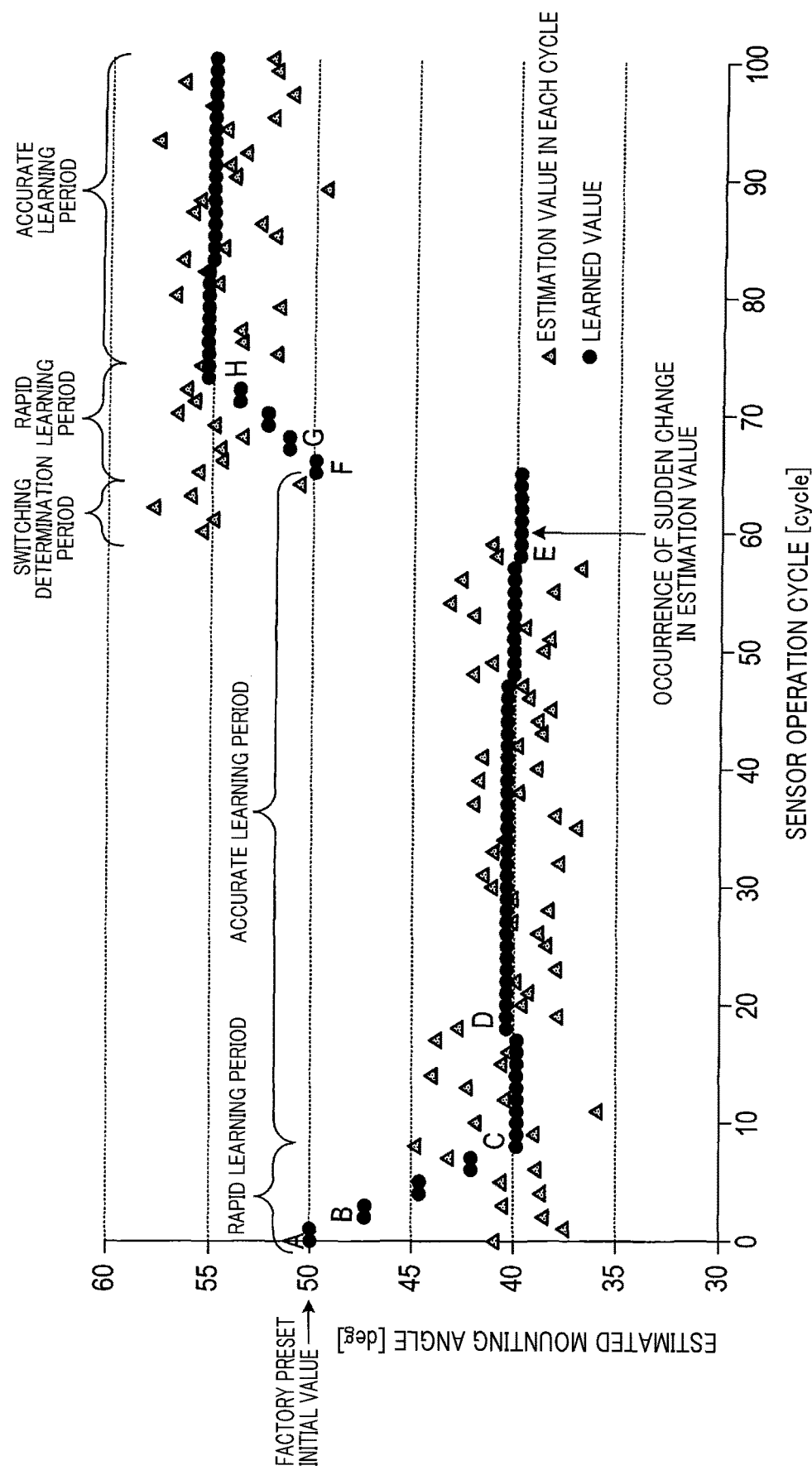
FIG. 8 is a time chart illustrating estimation values and learned values of the mounting angle.

FIG. 8 is a diagram illustrating a time series of estimation values θest and learned values θsm of the mounting angle. In FIG. 8, the factory preset mounting angle θinst is 50 [deg], the number of values for use in upper-level moving averaging is expressed by J=4, the number of lower-level average measurement cycles for rapid learning is expressed by I=2, the number of lower-level average measurement cycles for accurate learning is expressed by I=10, the predetermined period Tc is five measurement cycles, and the angle threshold value is 5 [deg]. FIG. 9 is a diagram illustrating four lower-level average values for use in the moving averaging at each of moments A to H in FIG. 8.

At moment A that is the learning start moment, rapid learning is executed, and the first moving average is calculated by assigning the mounting angle θinst to all of the estimation values θest for use in lower-level averaging and the four lower-level average values for use in upper-level moving averaging. Note that the learning start moment is in the first measurement cycle. At moment B in the third measurement cycle, rapid learning is executed again, and the learned value θsm is updated to the moving average of the average value of the estimation values θest obtained in the first and second measurement cycles and the three initial values. At moment C in the ninth measurement cycle, the learning mode is switched from rapid learning to accurate learning since learning has been completed four times. Therefore, at moment C, the learned value θsm is updated to the moving average of the average value of the estimation values θest obtained in 10 measurement cycles including moment C and the three lower-level average values obtained before. Note that since the number of estimation values θest is less than 10 at moment C, the shortfall is covered by the initial mounting angle θinst. At the next moment D, accurate learning is performed again, and the learned value θsm is updated every 10 measurement cycles.

At the next moment E, accurate learning is performed again. However, after the learned value θsm is updated at moment E, a sudden change in the mounting angle occurs in the second measurement cycle. Then, in the seventh measurement cycle from moment E, the absolute value of the difference between the average value θav and the learned value θsm becomes equal to or greater than the angle threshold value θth, and the learning mode is switched from accurate learning to rapid learning at moment F in the eighth measurement cycle from moment E. The period from the sudden change moment to moment F is a rapid learning switching determination period. Then, rapid learning is performed once more at the next moment G, and the learning mode is switched from rapid learning to accurate learning again at moment H.

<Effects>

According to the first embodiment described in detail above, the following effects are obtained.

(1) In the initial stage of learning, rapid learning is executed, and estimation values θest are more likely to be reflected in the learned value θsm, so that the learned value θsm can be rapidly brought close to the true value. In contrast, after the learned value θsm is brought close to the true value with the progress of learning, estimation values θest are less likely to be reflected in the learned value θsm, so that fluctuations in the learned value θsm due to error components included in estimation values θest can be prevented. Thus, both a reduction in the time required for convergence and an improvement in the accuracy of learning can be achieved.

(2) In the event of a sudden change in the mounting angle of the millimeter-wave radar 100, it is determined that the sudden change in the mounting angle has occurred, and the execution of rapid learning is started in the process of the next measurement cycle. Therefore, the learned value θsm can rapidly converge to the true value.

(3) Two-stage averaging is executed in the process of learning the mounting angle, so that the influence of errors included in estimation values θest on the learned value can be reduced even during rapid learning having a short averaging period for first-stage averaging. In other words, in rapid learning, the speed of learning can be improved, and the learned value θsm can be brought close to the true value with fluctuations in the learned value θsm prevented. In accurate learning, the accuracy of learning can be further improved.

(4) The number of cycles J for averaging estimation values θest is the same as the determination value J used in S200, so that the learning mode can be switched from rapid learning to accurate learning at the time that the influence of the initial mounting angle θinst on the learned value θsm becomes sufficiently low.

(5) Even when the factory preset mounting angle θinst differs from the true value of the mounting angle, the mounting angle is learned, so that incorrect detection of the bearing to an object can be prevented.

(Other Embodiments)

The mode for carrying out the technique of the present discloser has been described so far. However, the technique of the present discloser is not limited to the above embodiment, but can be put into practice in various ways.

(a) Any method may be used to calculate the estimation value θest of the mounting angle, instead of the method according to the above embodiment. For example, the track of a stationary object may be calculated while the vehicle is traveling in a straight line, and the estimation value θest may be calculated from the slope of the track of the stationary object.

(b) In the above embodiment, the number of cycles J for averaging estimation values θest is the same as the determination value J used in S200. However, the number of cycles J may be different from the determination value J.

(c) Any learning method may be used for learning as long as the degree W1 of the estimation value θest to the learned value θsm in rapid learning is greater than the degree W2 of the estimation value θest to the learned value θsm in accurate learning. For example, lower-level averaging alone may be performed without executing upper-level moving averaging. Alternatively, the number of lower-level averaging cycles I for rapid learning may be the same as that for accurate learning, whereas the number of average values J averaged in upper-level moving averaging may be smaller in rapid learning than in accurate learning. Still alternatively, the number of lower-level averaging cycles I and the number of values J for use in upper-level moving averaging may be smaller in rapid learning than in accurate learning.

(d) The initial mounting angle for the start of learning may not necessarily be a factory preset value.

(e) The millimeter-wave radar 100 may be another type of radar such as an FMCW radar, instead of the multi-frequency CW radar.

(f) In the above embodiment, a plurality of functions of a single component may be implemented by a plurality of components, or a single function of a single component may be implemented by a plurality of components. A plurality of functions of a plurality of components may be implemented by a single component, or a single function that is implemented by a plurality of components may be implemented by a single component. Part of the configuration of the above embodiment may be omitted. At least part of the configuration of the above embodiment may be added to or replaced by the configuration of another embodiment. Note that every aspect included in the technical idea specified only by the terms described in the claims is an embodiment of the present disclosure.

(g) In addition to the above-mentioned mounting angle learning device, the present disclosure can be implemented in various forms such as a system including the mounting angle learning device as a component, a program for causing a computer to function as the mounting angle learning device, a non-transitory tangible computer readable storage medium such as a semiconductor memory that stores the program, and a mounting angle learning method.

The invention claimed is:

1. A mounting angle learning device that learns a mounting angle representing an orientation of a vehicle-mounted radar in a vehicle, the vehicle-mounted radar being configured to detect a bearing to an object using electromagnetic waves, the mounting angle learning device comprising:
an estimation value calculation unit configured to repeatedly calculate estimation values of the mounting angle using transmission and reception waves of the vehicle-mounted radar; and
a learning unit configured to update, at a learning moment for learning the mounting angle, a learned value of the mounting angle to a value calculated by smoothing a plurality of the estimation values calculated by the learning moment, wherein
the learning unit includes:
a rapid learning unit configured to set, to a first degree, a degree of contribution of an estimation value calculated at the learning moment to the learned value updated;
an accurate learning unit configured to set the degree of contribution of the estimation value to a second degree lower than the first degree; and
a learning selection unit configured to select execution of learning by the rapid learning unit at the learning moment if a number of times of learning is less than a number threshold value, and select execution of learning by the accurate learning unit at the learning moment if the number of times of learning is greater than the number threshold value, the number of times of learning indicating how many times the learned value has been updated by a time the learning at the learning moment is started.

2. The mounting angle learning device according to claim 1, wherein
the learning unit further includes:
a sudden change determination unit configured to determine that a sudden change in the mounting angle has occurred if an average value of the estimation values in a preset determination period before the learning moment differs from the learned value at the learning moment by an angle threshold value or more; and
a reset unit configured to reset the number of times of learning to zero if it is determined by the sudden change determination unit that the sudden change has occurred.

3. The mounting angle learning device according to claim 1, wherein
the learning unit is configured to calculate, in each preset averaging period, an average value by averaging the estimation values in the averaging period just before the learning moment, and update the learned value to a moving average of average values in the averaging period,
the rapid learning unit is configured to set the averaging period to a first period, and
the accurate learning unit is configured to set the averaging period to a second period longer than the first period.

4. The mounting angle learning device according to claim 3, wherein
at the time that the learning is started, the rapid learning unit is configured to assign a fixed initial value to the average values for use in calculation of the moving average, and
the number threshold value is equal to a number of the average values for use in calculation of the moving average.

5. The mounting angle learning device according to claim 4, wherein
at the time that the learning is started, the rapid learning unit is configured to set the initial value of the average values for use in calculation of the moving average to a factory preset mounting angle.

* * * * *